US010530270B2

(12) United States Patent
Elserougi et al.

(10) Patent No.: US 10,530,270 B2
(45) Date of Patent: Jan. 7, 2020

(54) MODULAR ISOLATED HALF-BRIDGE BASED CAPACITOR-TAPPED MULTI-MODULE CONVERTER WITH INHERENT DC FAULT SEGREGATION CAPABILITY

(71) Applicant: Qatar University, Doha (QA)

(72) Inventors: Ahmed Elserougi, Doha (QA); Ahmed Massoud, Doha (QA); Shehab Ahmed, Doha (QA)

(73) Assignee: QATAR UNIVERSITY, Doha (QA)

( * ) Notice: Subject to any disclaimer, the term of this patent is extended or adjusted under 35 U.S.C. 154(b) by 0 days.

(21) Appl. No.: 16/206,797

(22) Filed: Nov. 30, 2018

(65) Prior Publication Data

US 2019/0173391 A1 Jun. 6, 2019

Related U.S. Application Data

(60) Provisional application No. 62/593,476, filed on Dec. 1, 2017.

(51) Int. Cl.
| | |
|---|---|
| *H02M 7/483* | (2007.01) |
| *H02H 7/122* | (2006.01) |
| *H02M 7/5387* | (2007.01) |
| *H02M 1/32* | (2007.01) |
| *H02M 1/00* | (2006.01) |

(52) U.S. Cl.
CPC .......... *H02M 7/483* (2013.01); *H02H 7/1225* (2013.01); *H02M 1/32* (2013.01); *H02M 7/53871* (2013.01); *H02M 2001/0003* (2013.01); *H02M 2001/325* (2013.01); *H02M 2007/4835* (2013.01)

(58) Field of Classification Search
CPC ....................................................... H02M 7/48
See application file for complete search history.

(56) References Cited

U.S. PATENT DOCUMENTS

| | | | |
|---|---|---|---|
| 2009/0243386 A1* | 10/2009 | Mimatsu | H02M 3/1584 307/9.1 |
| 2012/0147641 A1* | 6/2012 | Yamaguchi | H02M 1/34 363/132 |
| 2017/0104333 A1* | 4/2017 | Premerlani | H02J 3/383 |
| 2017/0264109 A1 | 9/2017 | Garnier et al. | |
| 2017/0264188 A1 | 9/2017 | Andersen et al. | |
| 2017/0264212 A1 | 9/2017 | Muguerza Olcoz et al. | |
| 2017/0271981 A1 | 9/2017 | Karlsson et al. | |
| 2017/0271990 A1* | 9/2017 | Knoedgen | H02M 3/158 |
| 2017/0279374 A1 | 9/2017 | Friebe et al. | |
| 2017/0284367 A1 | 10/2017 | Lee et al. | |
| 2017/0288394 A1 | 10/2017 | Yuan et al. | |
| 2017/0288409 A1 | 10/2017 | Yoscovich et al. | |
| 2017/0288569 A1 | 10/2017 | Uda et al. | |
| 2017/0294852 A1 | 10/2017 | Correa Vasques et al. | |

* cited by examiner

*Primary Examiner* — Kyle J Moody
*Assistant Examiner* — Trinh Q Dang
(74) *Attorney, Agent, or Firm* — Squire Patton Boggs (US) LLP

(57) ABSTRACT

An electrical converter, comprising a plurality of first modules and a plurality of second modules. At least one of the plurality of first modules includes a half-bridge module coupled with a direct current (DC)-link capacitor. A diode connected across the DC-link capacitor and a thyristor. At least one of the plurality of second modules is connected to at least one of the plurality of first modules.

13 Claims, 5 Drawing Sheets

US 10,530,270 B2

MODULAR ISOLATED HALF-BRIDGE BASED CAPACITOR-TAPPED MULTI-MODULE CONVERTER WITH INHERENT DC FAULT SEGREGATION CAPABILITY

CROSS-REFERENCE TO RELATED APPLICATION

This application claims the benefit of U.S. Provisional Application No. 62/593,476, filed Dec. 1, 2017.

BACKGROUND

Modular multilevel converters (MMCs) are good candidates for DC-AC conversion in high-voltage, high-power applications due to their modularity, scalability, and redundancy. However, MMCs require a large number of insulated gate bipolar transistors (IGBTs) and gate driver circuits.

SUMMARY

According to one non-limiting aspect of the present disclosure, an example of a modular capacitor-tapped multi-module converter (MCT-MC) may include a plurality of first modules and a plurality of second modules. Each of the plurality of first modules may include a half-bridge module coupled with a DC-link capacitor, a diode connected across the DC-link capacitor and a thyristor, and each of the plurality of second modules may be connected to each of the plurality of first modules.

Additional features and advantages are described herein, and will be apparent from the following Detailed Description and the Figures.

BRIEF DESCRIPTION OF THE DRAWINGS

For a proper understanding of this disclosure, reference should be made to the accompanying drawings, wherein.

DETAILED DESCRIPTION

The reader will appreciate the foregoing details, as well as others, upon considering the following Detailed Description of certain non-limiting embodiments of the MCT-MC according to the present disclosure. The reader may also comprehend certain of such additional details upon using the MCT-MC described herein.

The present disclosure provides a MCT-MC. In certain embodiments, a MCT-MC may include a plurality of identical normal modules and a plurality of redundant modules. The plurality of normal modules may include a half-bridge module with suitable DC-link capacitances ($C_d$), diodes ($D_d$) connected across the DC-link capacitances to avoid negative voltage occurring across those capacitors during DC-side faults, a back-to-back thyristor ($Q_i$) employed to segregate between the DC side and AC side in case of DC-side faults, a low-frequency transformer with certain turns ratio, such as N1:N2, at the final stage of the module to provide galvanic isolation and adjust the output voltage level, and a plurality of fast mechanical switches. The plurality of redundant modules may have similar circuit elements with respect to the normal modules, and/or may have a four port network, such as a single DC input and three AC outputs for phases A, B, and C. The MCT-MC may achieve the DC-AC conversion with a lower number of IGBTs, which may reduce system cost. In certain embodiments, a MCT-MC may employ identical normal and redundant modules, rated at a moderate voltage level, to interconnect a high-voltage DC-link and a medium-voltage AC grid network.

Figure 1:
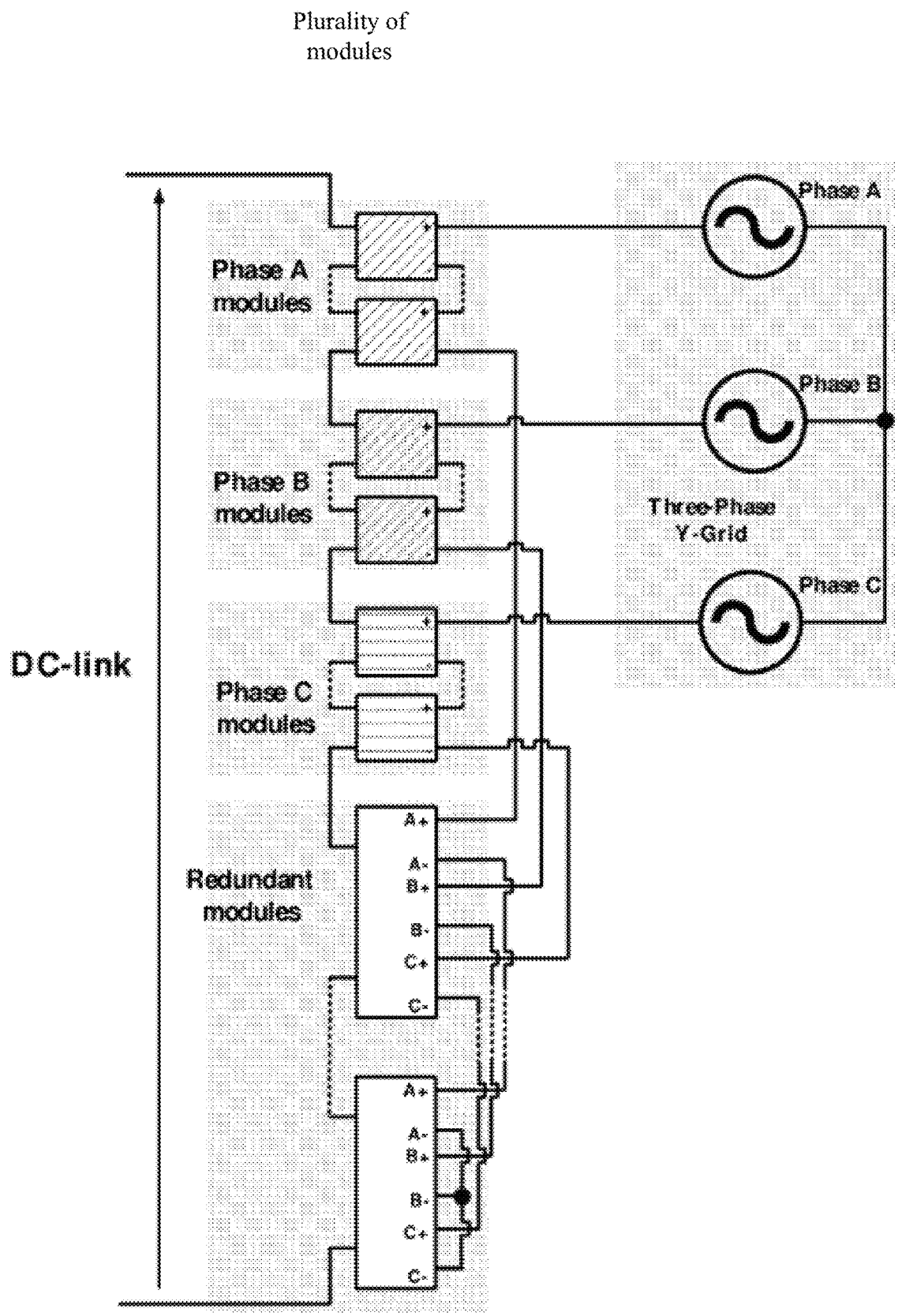
FIG. 1 is a schematic illustration of a non-limiting example of a structure of the MCT-MC according to some embodiments.
Figure 2:
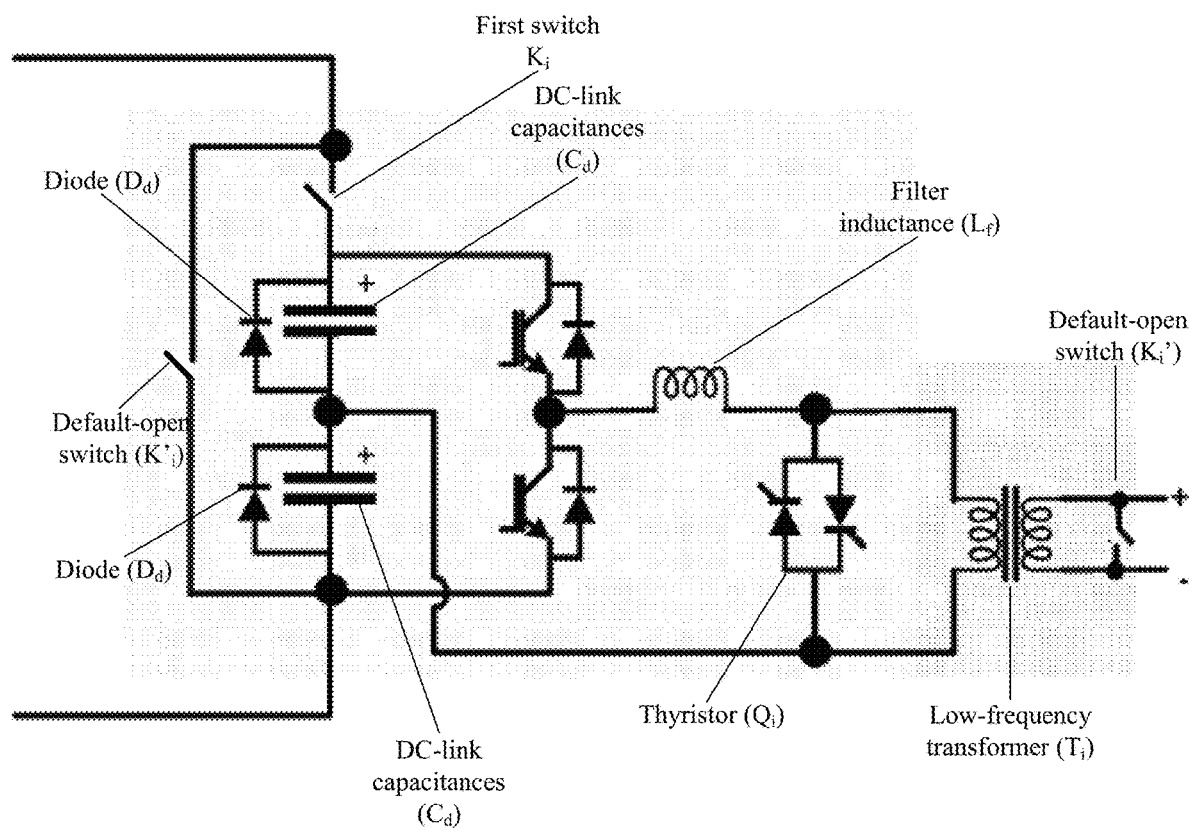
FIG. 2 is a schematic illustration of a non-limiting example of a structure of the normal module of the MCT-MC according to some embodiments.

Referring to FIG. 1, the illustrated structure of a MCT-MC may include N identical normal modules and M redundant modules. The normal modules may be divided into three groups, where each group (N/3 modules) may be assigned to one of the three-phase voltages (i.e., phase A modules, phase B modules, and phase C modules). The structure of the normal module is shown in FIG. 2, where it may be considered as a two-port network (a single DC input and a single AC output). The DC input side of the modules (including the redundant modules) may be connected in series. Alternatively, the per-phase AC output sides of the modules may be connected in series, as shown in FIG. 1.

Referring to FIG. 2, the illustrated structure of a normal module may include a half-bridge module with suitable DC-link capacitances ($C_d$). The diodes ($D_d$) may be connected across the DC-link capacitances to avoid negative voltage being present across those capacitors during DC-side faults. The half-bridge module may be operated with conventional sinusoidal pulse width modulation (SPWM) with bipolar AC output. In order to ensure an acceptable quality of generated AC current output, a suitable filter inductance ($L_f$) may be employed. In some embodiments, the inductance filter may be one of the simplest types of filters for grid-connected converters.

In certain embodiments, back-to-back thyristors ($Q_i$) may be employed to segregate between the DC side and AC side in the event of DC-side faults. In some embodiments, Qi may be turned off; however, after detecting a DC-side fault, the IGBT pulses may be inhibited, and $Q_i$ may be turned on, which may allow decaying of DC-fault current freely to zero, such as interrupting the AC side contribution in the DC-fault (i.e., segregation between AC side and DC side fault). This technique may allow conventional AC circuit breakers to be safely employed to interrupt the AC-side fault current, which may avoid over-current stresses on the involved semiconductor devices.

In certain embodiments, a low-frequency transformer with a certain turns ratio, such as N1:N2, may be employed at the final stage of the module to provide galvanic isolation and/or adjust the output voltage level. The module may be equipped with fast mechanical switches, such as $K_i$ and $K'_i$, where $K_i$ is a default-closed switch, and $K'_i$ is a default-open switch. In the event of a module failure, $K_i$ may be opened and $K'_i$ may be closed to bypass the module from the DC side as well as the AC side. When the module is bypassed, it may be replaced simultaneously with one of the redundant modules.

Figure 3:
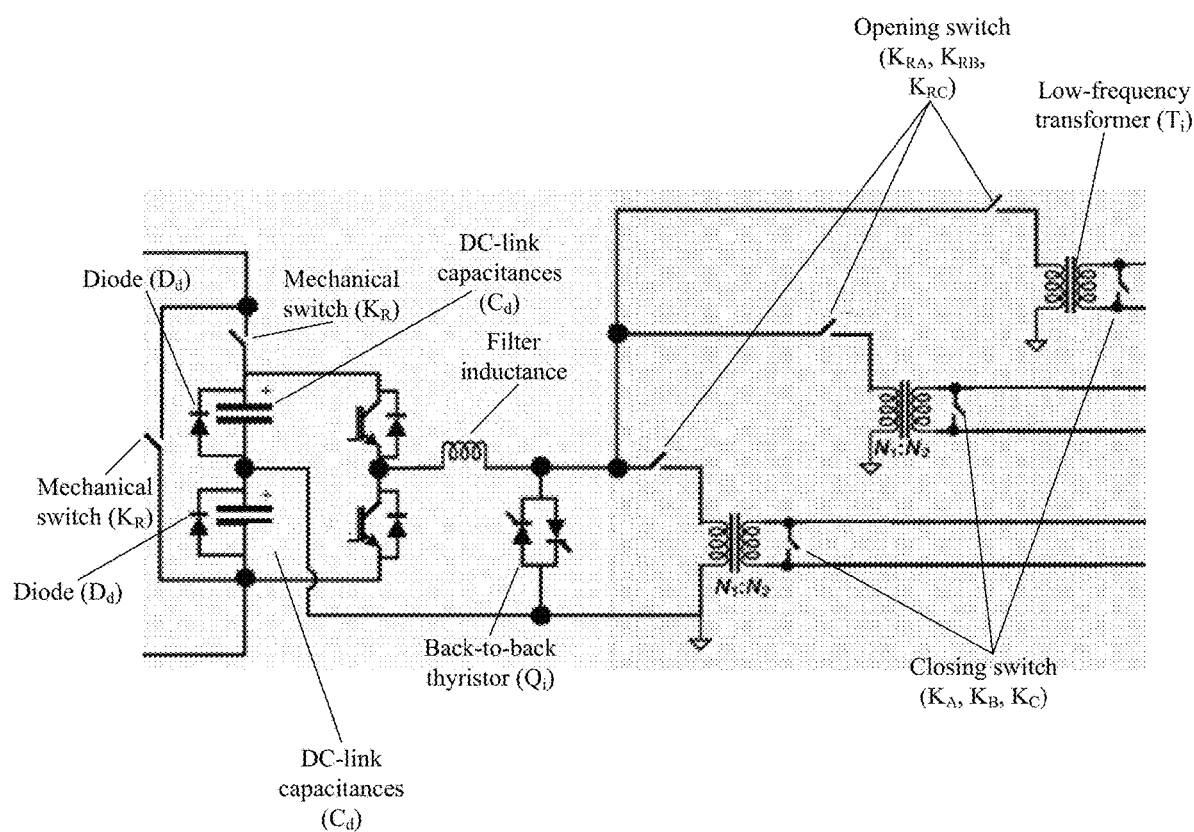
FIG. 3 is a schematic illustration of a non-limiting example of a structure of the redundant module of the MCT-MC according to some embodiments.

Referring to FIG. 3, the illustrated structure of a redundant module may include a four port network, for example, a single DC input and three AC outputs for phases A, B, and C. In certain embodiments, the redundant module may be deactivated, and/or may be bypassed from the DC side by closing mechanical switch $K_R$ and opening mechanical switch $K'_R$. Additionally or alternatively, AC terminals may be bypassed during normal conditions by closing switches $K_A$, $K_B$, and $K_C$, and opening switches $K_{RA}$, $K_{RB}$, and $K_{RC}$.

In the event of at least one module failure, the redundant module may be employed as a replacement to the failed module by bypassing the failed module, and the redundant module may be activated and inserted simultaneously. This may be achieved by opening switch $K_R$ and closing switch $K'_R$ in the DC side. Alternatively, with respect to the mechanical switches on the AC side, if a failed module is in phase h group, where h represents phase A, B, or C, switch $K_h$ may be opened, and $K_{Rh}$ may be closed. The redundant module may then be operated with the modulating signal of the failed module.

Based on the aforementioned information, the DC voltage across the DC terminals of each activated module may equal $V_{dc}/N$, i.e., the voltage rating of the involved IGBTs may be higher than $V_{dc}/N$. The voltage across DC-link capacitors of activated modules may equal $V_{dc}/2N$, i.e., bipolar AC output voltage$+/-V_{dc}/2N$ may be generated across the AC terminals of the half-bridge converter. As a result, the fundamental component of the generated AC voltage from each module may equal $MV_{dc}/2N$, where M is the peak of the modulating signal. The phase angle of generated voltage may be easily controlled by controlling the modulating signal phase angle. By controlling the generated voltage magnitude and phase angle of the involved modules, the injected active/reactive power into the AC grid may be controlled.

Figure 4:
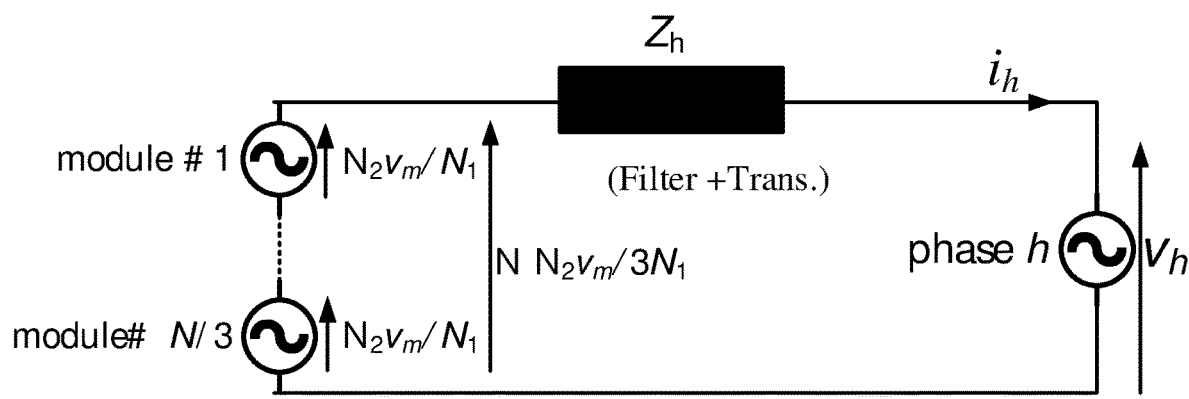
FIG. 4 is a schematic illustration of a non-limiting example of a per-phase AC equivalent circuit of the MCT-MC according to some embodiments.
Figure 5:
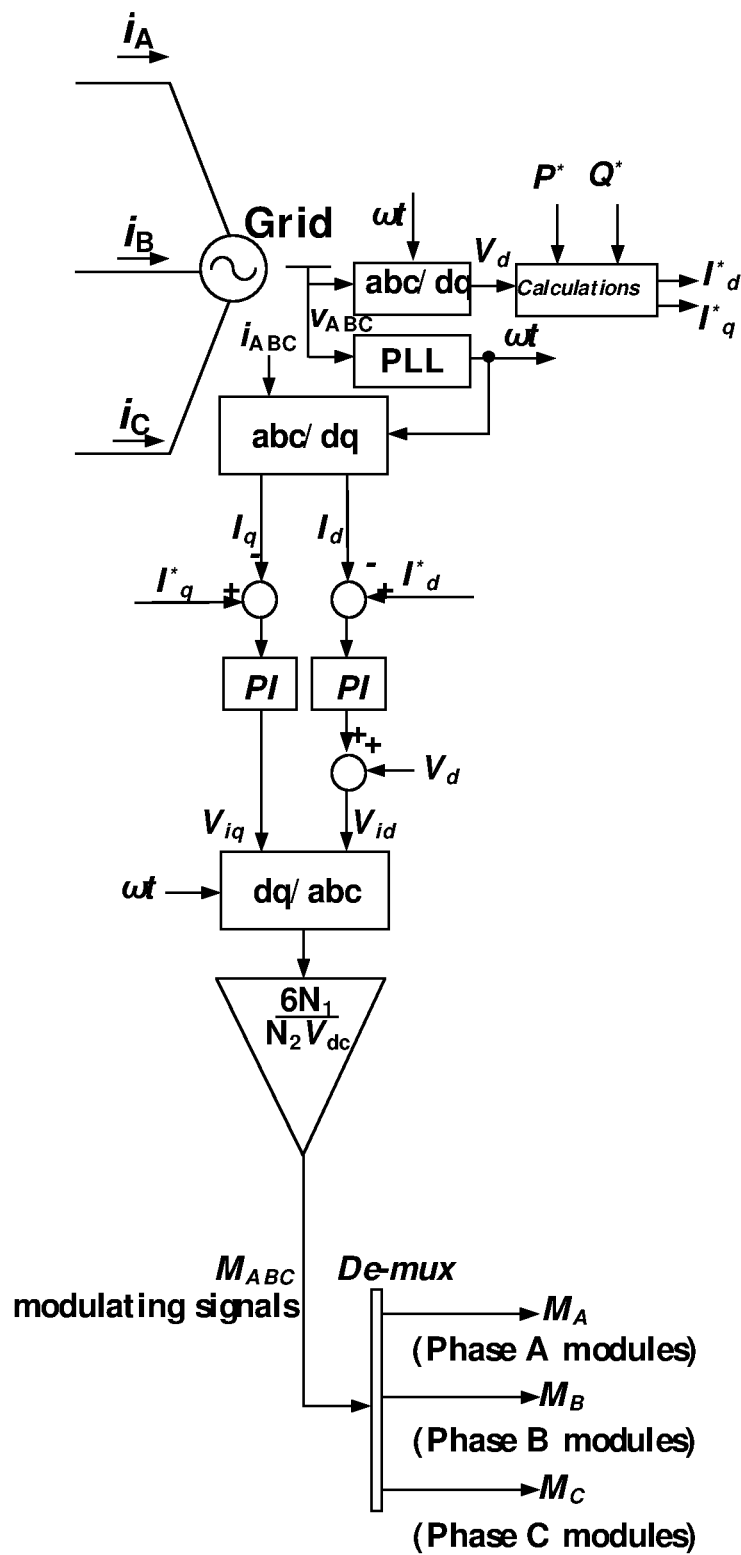
FIG. 5 is a schematic illustration of a non-limiting example of a power control of the MCT-MC according to some embodiments.

FIG. 4 illustrates a per-phase AC equivalent circuit of the MCT-MC. The active and reactive power flow may be controlled via controlling the magnitude and phase of module voltage ($v_m$) by generating the suitable modulating signal for the half-bridge module. In some embodiments, different conventional power control techniques may be employed to control injected active/reactive power into an AC grid, such as dq-frame based active and reactive power control as well as power angle control techniques. For example, FIG. 5 illustrates the dq-frame based power control of the proposed architecture.

The MCT-MC may provide several advantages, including DC-AC conversion with a lower number of IGBTs compared to modular multilevel converters, a modular structure of a capacitor-tapped multi-module converter, DC fault segregation capability, and fault ride through capability with the possibility of hot-swapping of any faulty modules.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with steps in a different order, and/or with hardware elements in configurations that are different from those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Partial Glossary
AC Alternating Current
DC Direct Current
IGBT Insulated Gate Bipolar Transistor
MCT-MC Modular Capacitor-Tapped Multi-module Converter
MMC Modular Multilevel Converter
SPWM Sinusoidal Pulse Width Modulation

We claim:
1. An electrical converter, comprising:
a plurality of first modules and a plurality of second modules, wherein at least one of the plurality of first modules includes a half-bridge module coupled with a direct current (DC)-link capacitor; and
a diode connected across the DC-link capacitor and a thyristor, wherein
at least one of the plurality of second modules is connected to at least one of the plurality of first modules;
DC voltage across the DC terminals of each activated module equals V.sub.dc/N, or
voltage across DC-link capacitors of activated modules equals V.sub.dc/2N;
dq-frame based active and reactive power controls control active/reactive power injected into an AC grid,
the fundamental component of the generated AC voltage from each module equals MV.sub.dc/2N, where M is the peak of the modulating signal,
a phase angle of generated voltage is controlled by controlling the modulating signal phase angle, or
per-phase AC output sides of the modules are connected in series; and
after detecting a DC-side fault, IGBT pulses are inhibited, and back-to-back thyristors are turned on, causing decay of DC-fault current freely to zero.
2. The electrical converter of claim 1, wherein the half-bridge module is configured to operate with sinusoidal pulse width modulation with bipolar alternating current output.
3. The electrical converter of claim 1, wherein the plurality of first modules further include at least one filter inductance connected to at least one terminal of the half-bridge module.
4. The electrical converter of claim 1, wherein the plurality of first modules further include a first switch and a second switch.
5. The electrical converter of claim 1, wherein the thyristor is a back-to-back thyristor configured to segregate between a DC side and an AC side of the electrical converter.
6. The electrical converter of claim 1, wherein the electrical converter is a DC-AC converter.
7. The electrical converter of claim 1, wherein the plurality of second modules include a single DC input and three AC outputs.
8. The electrical converter of claim 1, wherein at least one of the plurality of second modules is activated simultaneously when at least one of the plurality of first modules fails to operate.

9. The electrical converter of claim 1, wherein the electrical converter further comprises a per-phase AC equivalent circuit.

10. The electrical converter of claim 1, wherein the plurality of first modules are divided into three groups, wherein each group (N/3 modules) is associated with one of the three-phase voltages.

11. The electrical converter of claim 4, wherein the first switch is closed while the second switch is open.

12. The electrical converter of claim 4, wherein the first switch is open while the second switch is closed.

13. The electrical converter of claim 9, wherein active and reactive power flow is controlled by controlling the magnitude and phase of module voltage through suitable modulating signals for the half-bridge module.

* * * * *